US008553374B2

(12) United States Patent
Doellerer et al.

(10) Patent No.: US 8,553,374 B2
(45) Date of Patent: Oct. 8, 2013

(54) MODULAR CIRCUIT CONFIGURATION FOR SWITCHING ELECTRICAL POWER AND AN ADAPTER DESIGNED TO THIS END

(75) Inventors: Frank Doellerer, Hameln (DE); Andreas Woehrmeier, Doerentrup (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 21 days.

(21) Appl. No.: 13/260,386

(22) PCT Filed: Mar. 22, 2010

(86) PCT No.: PCT/EP2010/001784
§ 371 (c)(1),
(2), (4) Date: Sep. 26, 2011

(87) PCT Pub. No.: WO2010/112150
PCT Pub. Date: Oct. 7, 2010

(65) Prior Publication Data

US 2012/0026640 A1 Feb. 2, 2012

(30) Foreign Application Priority Data

Mar. 30, 2009 (DE) ........................ 10 2009 014 944

(51) Int. Cl.
*H02J 3/00* (2006.01)
*H02H 7/00* (2006.01)

(52) U.S. Cl.
USPC ........................................................... 361/8

(58) Field of Classification Search
USPC ........................................................... 361/8
See application file for complete search history.

(56) References Cited

U.S. PATENT DOCUMENTS

| | | | | |
|---|---|---|---|---|
| 5,578,980 | A | 11/1996 | Okubo et al. | |
| 6,078,491 | A | 6/2000 | Kern et al. | |
| 6,531,940 | B1 | 3/2003 | Busch | |
| 6,643,112 | B1 * | 11/2003 | Carton et al. | 361/152 |
| 7,836,307 | B2 * | 11/2010 | Aihara et al. | 713/169 |
| 2002/0171983 | A1 | 11/2002 | Brooks | |
| 2004/0109293 | A1 | 6/2004 | Apfelbacher et al. | |
| 2005/0225920 | A1 | 10/2005 | Dunemann | |
| 2008/0048807 | A1 | 2/2008 | Yao et al. | |
| 2008/0137238 | A1 | 6/2008 | Wright et al. | |

FOREIGN PATENT DOCUMENTS

| | | | |
|---|---|---|---|
| DE | 2613929 | A1 | 10/1977 |
| DE | 29622701 | U1 | 4/1997 |
| DE | 10203682 | A1 | 8/2003 |
| DE | 102005025766 | A1 | 12/2005 |
| EP | 1281189 | B1 | 6/2004 |
| EP | 1655753 | A2 | 5/2006 |
| EP | 1203442 | B1 | 2/2007 |
| EP | 1930922 | A2 | 6/2008 |
| EP | 2023457 | A2 | 2/2009 |
| WO | WO 0072342 | A2 | 11/2000 |

OTHER PUBLICATIONS

European Patent Office, International Search Report in International Patent Application No. PCT/EP2010/001784 (Jun. 25, 2010).

* cited by examiner

*Primary Examiner* — Dharti Patel
(74) *Attorney, Agent, or Firm* — Leydig, Voit & Mayer, Ltd.

(57) ABSTRACT

A modular circuit arrangement for switching electrical power includes a relay socket, an adapter and a relay. The adapter is detachably connectable to the relay socket and includes a semiconductor relay and a control unit electrically connected to the semiconductor relay. The relay includes a mechanical switch and is electrically and mechanically detachably connectable to the adapter so as to connect the semiconductor relay of the adapter in parallel to the mechanical switch. The control unit is configured to actuate the relay and the semiconductor switch at different times.

12 Claims, 3 Drawing Sheets

MODULAR CIRCUIT CONFIGURATION FOR SWITCHING ELECTRICAL POWER AND AN ADAPTER DESIGNED TO THIS END

CROSS REFERENCE TO RELATED APPLICATIONS

This application is a U.S. National Phase application under 35 U.S.C. §371 of International Application No. PCT/EP2010/001784, filed on Mar. 22, 2010, and claims benefit to German Patent No. DE 10 2009 014 944.9, filed on Mar. 30, 2009. The International Application was published in German on Oct. 7, 2010 as WO 2010/112150 A1 under PCT Article 21 (2).

FIELD

The invention relates to a modular circuit arrangement for switching electric power as well as to an adapter designed to be used in such a modular circuit arrangement.

BACKGROUND

Electromechanical switches, in other words relays or contactors, are often employed in order be able to switch electric power. As a rule, relays are inexpensive. Moreover, they stand out for their high switching capacity, low power loss and insensitivity with respect to brief overloads. However, due to their mechanical structure, which comprises movable armatures and movable normally open contacts, relays are prone to wear and tear. This is why electronic relays, in other words, semiconductor relays, are being used more and more often in applications that require a high switching frequency. Such electronic switches are also known as solid-state relays. Semiconductor relays are characterized by very little wear and tear, low sensitivity to vibration as well as a high switching frequency.

SUMMARY

In an embodiment, the present invention provides a modular circuit arrangement for switching electrical power including a relay socket, an adapter and a relay. The adapter is detachably connectable to the relay socket and includes a semiconductor relay and a control unit electrically connected to the semiconductor relay. The relay includes a mechanical switch and is electrically and mechanically detachably connectable to the adapter so as to connect the semiconductor relay of the adapter in parallel to the mechanical switch. The control unit is configured to actuate the relay and the semiconductor switch at different times.

BRIEF DESCRIPTION OF THE DRAWINGS

The invention will be explained in greater detail below on the basis of embodiments in conjunction with the accompanying drawings, in which.

DETAILED DESCRIPTION

Figure 1:
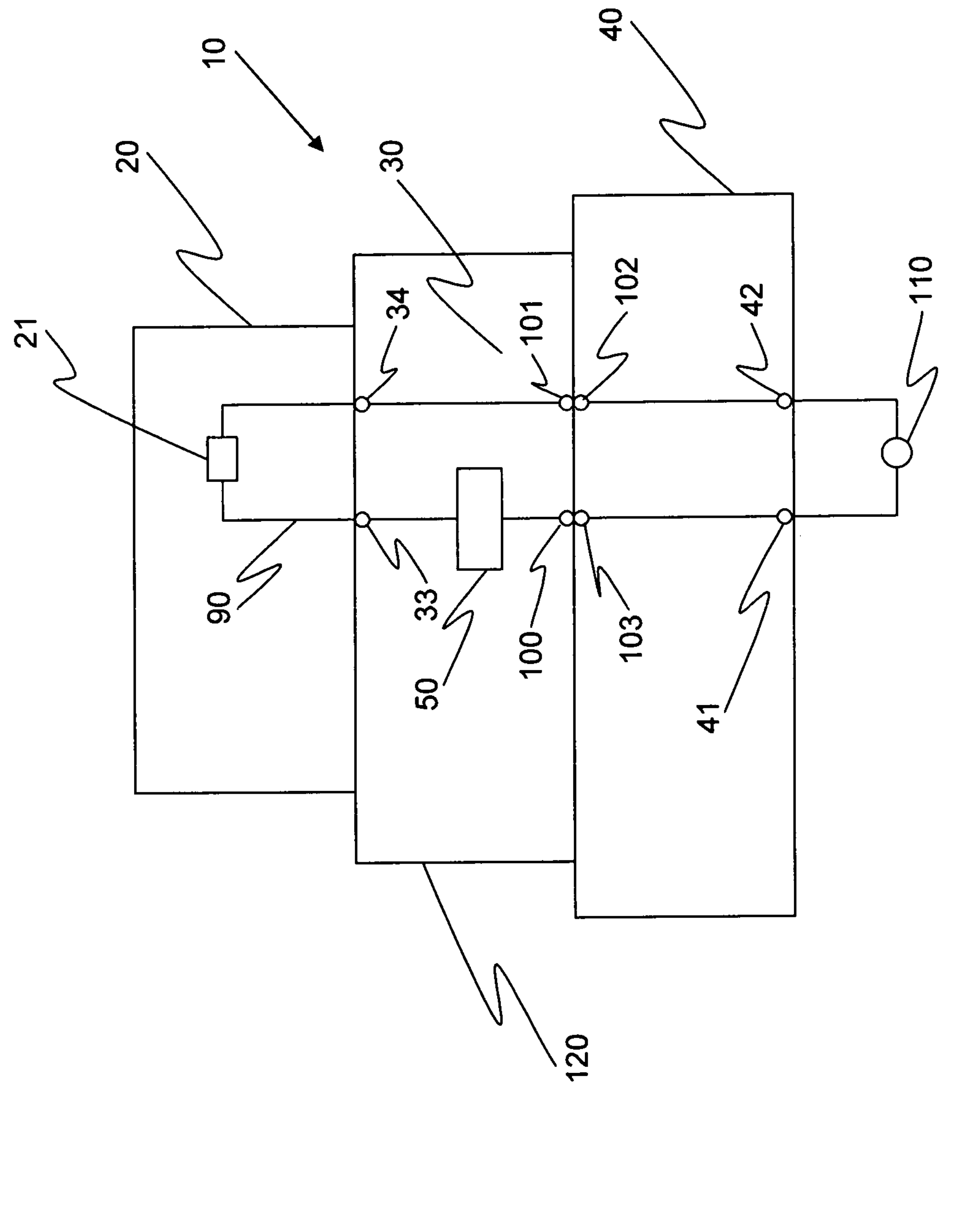
FIG. 1 shows a schematic side view of a modular circuit arrangement for switching electric power according to an embodiment of the invention.

In an embodiment, the present invention provides a modular circuit arrangement for switching electric power with which the wear and tear of conventional relays can be markedly reduced.

In an embodiment, the present invention allows connecting an electromechanical switch—that is to say, a relay or a contactor having an electronic switch, in other words, a semiconductor relay—in such a way that the contacts of the relay can be opened and closed with virtually no load and thus with very little wear and tear. Further, an embodiment of the invention provides a semiconductor relay that is part of an adapter, wherein the relay and the adapter are configured as separate modules that can be detachably joined to each other. As a result, the relay and/or the semiconductor relay can be replaced independently of each other in case of a malfunction.

According to an embodiment of the invention, a modular circuit arrangement is provided for switching electric power. The modular circuit arrangement has a relay socket that can be detachably joined to an adapter arranged in an adapter housing. The adapter has a semiconductor relay, in other words, an electronic switch, as well as a control unit electrically connected thereto. A relay is also provided that can be detachably connected electrically and mechanically to the adapter in such a way that, in the connected state, the semiconductor relay is connected in parallel to a mechanical switch of the relay. The control unit is configured in such a manner that it can actuate the relay and the semiconductor relay at different points in time.

At this juncture, it should be pointed out that the relay can also be a contactor that is dimensioned for higher power ratings. The semiconductor relay can be made with transistors or thyristors or triacs in a commonly known manner. The relay socket and the relay can be standard components.

Advantageously, the adapter has at least one first terminal that serves to apply a control signal to the control unit, as well as second terminals that serve to connect the relay to the semiconductor relay and to the control unit, namely, in order to activate and deactivate the relay. In the connected state, the mechanical switch of the relay is connected in parallel to the semiconductor relay. The relay has complementary connecting terminals at the appropriate places. Control signals can also be applied to an appropriate connector of the relay socket, whereby in the connected, that is to say, joined, state of the circuit arrangement, there is then an electric connection through the relay socket to the at least one first terminal.

In order to be able to connect a load to the relay, the modular circuit arrangement can have fourth connectors. These fourth connectors can be arranged, for instance, on the adapter, so that the load can be connected directly to the adapter. It is likewise conceivable for the load to be connected to the relay socket. With this approach, in the connected state, a section of the load circuit of the relay containing the load runs through the relay socket and the adapter.

According to an embodiment, a voltage source is implemented in the adapter, and this voltage source can be connected to the relay via the control unit.

According to an alternative embodiment, the relay socket is designed to connect a voltage source. In this case, when the relay socket, the adapter and the relay are in the connected state, they are electrically connected in such a way that the voltage source can be connected to the relay by means of the control unit.

In order for the stress on the relay to be substantially with no load, or at least with a low load, thus entailing low wear and tear, in response to a first control signal that serves to activate the relay, the control unit switches on the semiconductor relay at a first point in time, and it activates the relay at a second, later point in time. In this manner, it is ensured that a load current flows through the semiconductor relay at the switching instant of the relay.

If the semiconductor relay is not switched off during the operation of the relay, then, in response to a second control signal, the control unit deactivates the relay and switches off the semiconductor relay at a later point in time, for example, after a few milliseconds.

For purposes of reducing the power loss in the semiconductor relay, the semiconductor relay can also be switched off at a third point in time during the active operation of the relay. In order to deactivate the relay, in response to a second control signal, the control unit first causes the semiconductor relay to be switched on. After an adjustable time interval has elapsed, the control unit ensures that the relay is deactivated. Deactivating means that the contacts of the relay are opened or closed depending on whether the relay is operated as a break contact element or as a make contact element. Subsequently, the semiconductor relay is switched off again.

In an embodiment, the present invention provides an adapter that is configured for use in the modular circuit arrangement described above. The adapter is accommodated in a housing and it has a first means to be detachably, electrically and/or mechanically connected to a relay socket, and a second means to be detachably, electrically and/or mechanically connected to a relay. Moreover, a semiconductor relay and a control unit electrically connected thereto are installed in the adapter.

FIG. 1 shows, by way of an example, a modular circuit arrangement 10 for switching electric power. The modular circuit arrangement 10 can have a commercially available, standardized industrial relay socket 40. Moreover, the modular circuit arrangement can comprise a commercially available industrial relay 20 that is accommodated in a conventional housing.

The relay socket 40 and the relay 20 are coordinated with each other in such a way that the relay 20 can be placed onto the relay socket. Moreover, an adapter 30 is provided that is accommodated in a suitable housing 120. The structure and mode of operation of the adapter 30 will still be described in greater detail below. The relay socket 40, the adapter 30 and the relay 20 together form the modules of the modular circuit arrangement 10.

The adapter 30 is detachably connected electrically and mechanically to the relay socket 40. The relay 20, in turn, is detachably connected electrically and mechanically to the adapter housing 120. The relay socket 40 can have connecting contacts 41 and 42 to which a direct-voltage source 110 can be connected. The direct-voltage source 110 supplies the control voltage for a relay coil 21 of the relay 20. For this purpose, the connecting contacts 41 and 42 are electrically connected to a connecting contact 103 or to a connecting contact 102 of the relay socket 40. In the connected state of the modular circuit arrangement 10, an electric connection exists between the contacts 103 or 102 of the relay socket 40 and the connecting contacts 100 or 101 of the adapter 30. As also schematically shown in FIG. 1, the connecting contact 101 is electrically connected to a connecting contact 34 of the adapter 30, and the connecting contact 100 is electrically connected via a control unit 50 to a connecting terminal 33 of the adapter 30. For this purpose, the control unit 50 has an electronic switch. The connecting contacts 100 and 101 are advantageously arranged on the side of the adapter housing 120 facing the relay socket 40, while the connecting terminals 33 and 34 are arranged on the opposite side of the adapter housing 120. In the connected state, the relay coil 21 is connected to the connecting terminals 33 and 34 via appropriate connecting contacts of the relay 20. In the embodiment shown, the control circuit of the relay 20, a section of which is depicted in FIG. 3 and which has the reference numeral 90, thus runs from the relay coil 21 via the adapter 30 and the relay socket 40 to the direct voltage source 110 and then back again.

Figure 2:
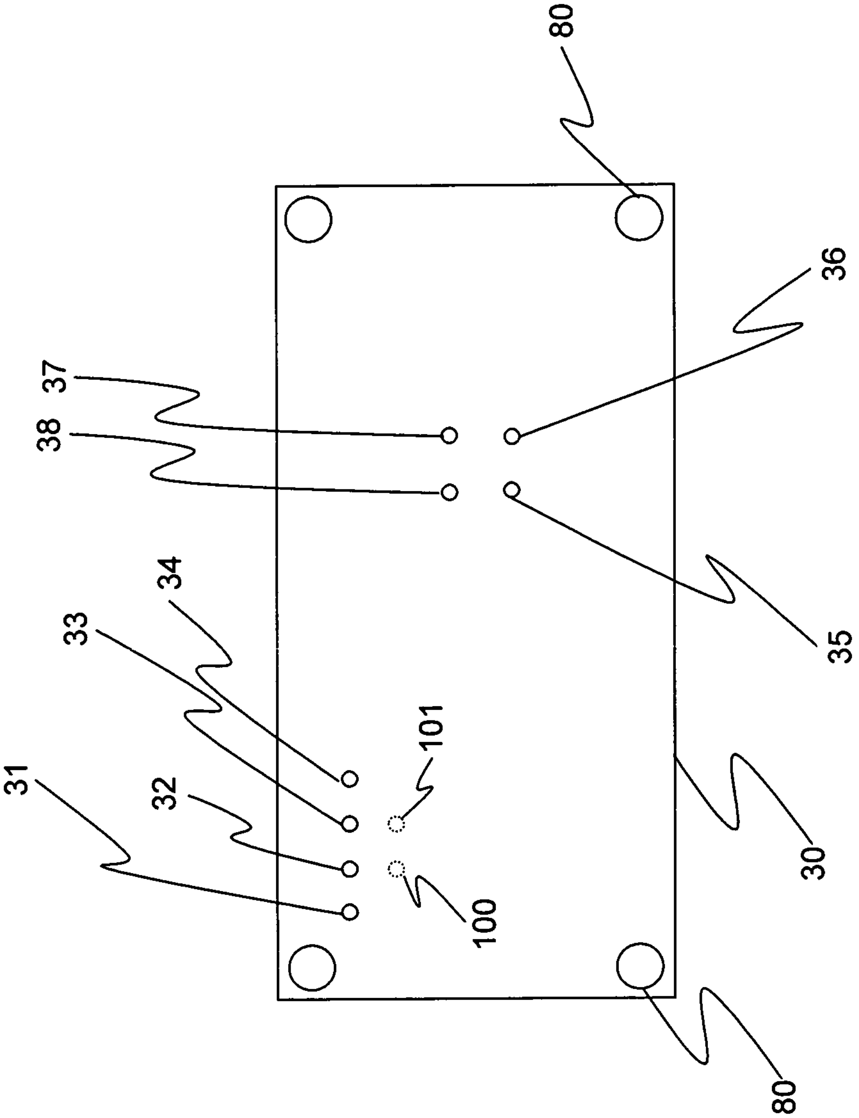
FIG. 2 is a top view of the adapter shown in FIG. 1, with appropriate connecting terminals and positioning pins.

FIG. 2 shows, by way of an example, a terminal assignment of the adapter 30. Connecting terminals 31 and 32 are provided on the side of the adapter housing 120 facing the relay 20 so that control signals can be fed to the adapter 30. The relay coil 21 is connected to the connecting terminals 33, 34, while a mechanical switch 22, in other words, the contacts of the relay 20, can be connected to the connecting terminals 36, 37. The mechanical switch 22 is shown in FIG. 3. The corresponding connecting contacts of the relay 20 are not shown. The contact connections 100 and 101 are provided on the bottom of the adapter housing 120. Guide pins 80 that engage into matching cutouts of the relay socket 40 can be provided in the housing 120 of the adapter 30. Corresponding guide pins or guide holes are arranged on the top of the housing 120 or on the bottom of the relay 20.

The electric equivalent circuit diagram of the hybrid circuit consisting of the adapter 30 and the relay 20 that was created in the connected state is explained in greater detail below with reference to FIG. 3.

Figure 3:
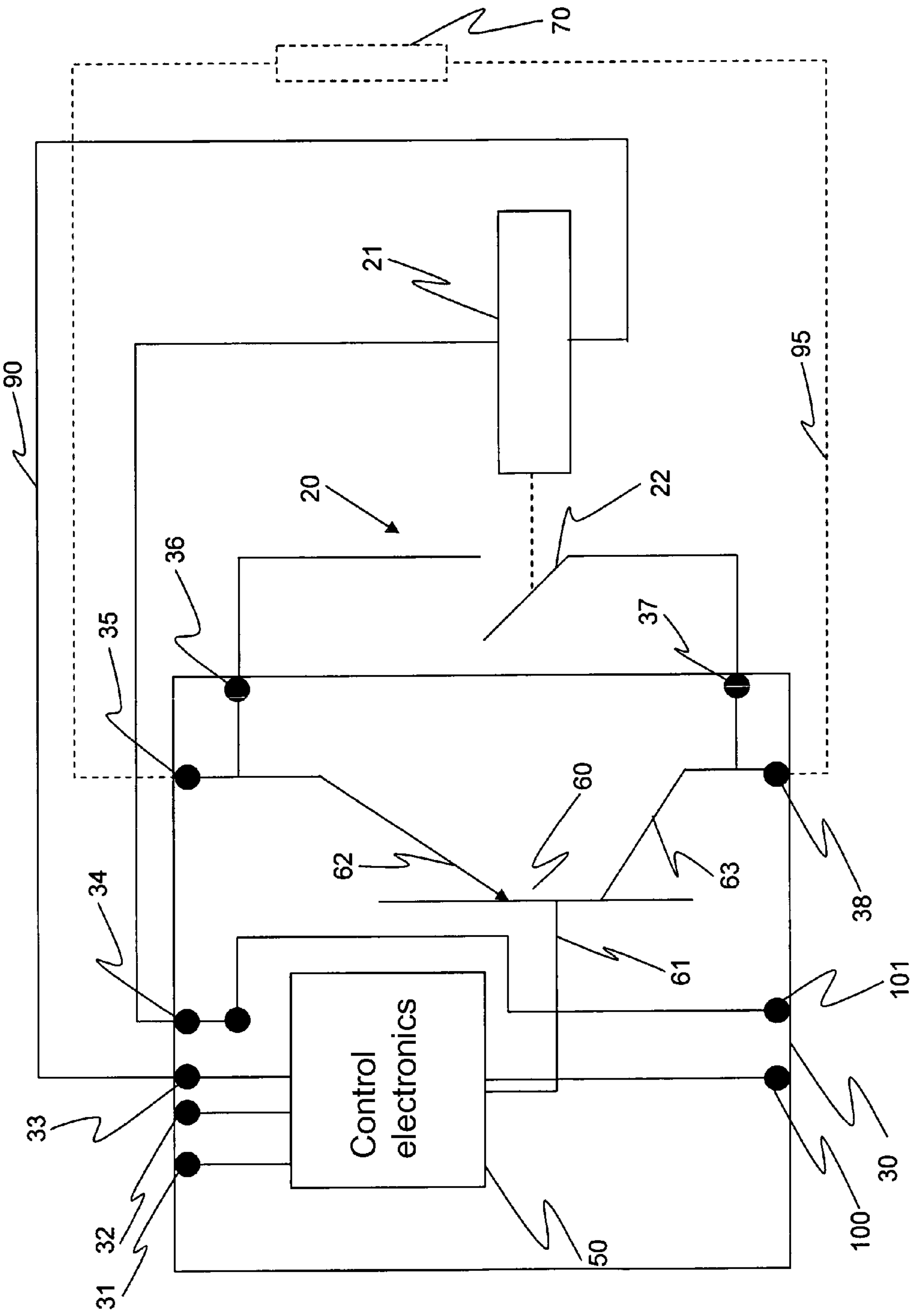
FIG. 3 is an equivalent circuit diagram of a hybrid circuit that, in the connected state, is formed by the adapter and the relay.

FIG. 3 shows, among other things, the circuitry structure of the adapter 30 depicted in FIG. 1 without the housing 120. The adapter 30 contains the control unit 50 that is shown in FIG. 1 and that is connected to a semiconductor relay 60 that is also referred to as a solid-state relay. The semiconductor relay 60 can be configured, for instance, as a PNP transistor. In this case, the output of the control unit 50 is connected to the base terminal 61 of the transistor 60. The adapter 30 has, for example, the two connecting contacts 31 and 32—likewise shown in FIG. 2—whose input is connected to the control unit 50. Control signals, for instance, to activate and deactivate the relay 20, can be applied to the two connecting contacts 31 and 32. The adapter 30 also has the connecting contact 35, which is connected to the emitter terminal 62 of the semiconductor relay 60. The connecting contact 38 is connected to the collector terminal 63 of the semiconductor relay 60. A load 70 can be connected to the connecting contacts 35 and 38 of the adapter 30 via a load circuit 95 of the relay 20. The load circuit 95 and the load 70 are depicted by broken lines in FIG. 3. A source of energy that supplies the load 70 is not shown. It should be pointed out that, as an alternative, the load 70 can also be connected to the relay socket 40. In this case, when the modular circuit arrangement 10 is in its assembled state, the load circuit 95 is fed at least partially through the relay socket 40 and the adapter 30. The relay 20 is electrically connected to the adapter 30 via the connecting terminals 36 and 37 shown in FIG. 2. Since the connecting terminals 36 and 37 are electrically connected to the emitter terminal 62 or to the collector terminal 63 of the semiconductor relay 60, in the assembled state, the mechanical switch 22 of the relay 20 is connected in parallel to the semiconductor relay 60. When the relay 20 is placed onto the adapter housing 120, the relay coil 21 is connected via one connector to the connecting contact 34 and via the second connector to the connecting contact 33 of the adapter 30. In the example shown, the connecting contact 34 of the adapter 30 is connected directly to the connecting contact 101, while the connecting contact 33 is connected to the connecting contact 100 of the adapter 30 via the control unit 50. This connection is schematically shown in FIG. 1 as well. With this embodiment, the control unit 50 has the controllable switch (not shown here) mentioned in conjunction with FIG. 1, which is connected between the connecting contacts 33 and 100. The controllable switch and the control logic of the control unit 50, which actuates the controllable switch and the semiconductor relay 60, can be configured as separate components, in contrast to the version shown. Once the adapter housing 120 is placed onto the relay socket, the connecting contacts 100 and 101 of the adapter 30 are electrically connected to the corresponding connecting contacts 102 and 103 of the relay socket, so that the relay coil 21, as shown in FIG. 1, is electrically connected to the direct-voltage source 110. Therefore, the relay coil 21, the control unit 50 and the direct-voltage source 110 are located in the control circuit 90 of the relay 20.

As shown in FIG. 3, the semiconductor relay 60 of the adapter 30 and the relay 20 form a hybrid circuit in which the semiconductor relay 60 is connected in parallel to the mechanical switch 22 of the relay 20. The hybrid circuit is thus a component of the load circuit 95 of the relay 20.

The mode of operation of the modular circuit arrangement 10 schematically depicted in FIGS. 1 and 3 will now be explained in greater detail.

To start with, it is assumed that the relay socket 40 is preferably latched onto a top-hat rail, and that the direct-voltage source 110 is connected to the terminals 41 and 42 of the relay socket 40, as depicted in FIG. 1.

The adapter housing 120 and thus the adapter 30 are placed onto the relay socket 40, so that the connecting contacts 100 and 101 of the adapter 30 are electrically connected to the connecting contact 102 or 103 of the relay socket 40. The relay 20 has already been placed onto the adapter housing 120, so that the relay coil 21 is electrically connected to the terminals 33 and 34, while the mechanical switch 22, in other words, the normally open contacts of the relay 20, are electrically connected to the contacts 36 and 37 of the adapter 30. Moreover, it is assumed that the load circuit 95 is connected to the connecting contacts 35 and 38 of the adapter housing 120. For the further considerations, it is assumed that the relay 20 is operated as a make contact element, that is to say, in the stand-by state, the mechanical switch 22 is open.

If the relay 20 is to be activated, an activation signal is applied to the control unit 50, for example, via the connecting contact 31. In response to the activation signal, the control unit 50 first actuates the semiconductor relay 60 to the conductive state, so that the load circuit 95 is closed and the load current can only flow via the semiconductor relay 30. At this instant, the mechanical switch 22 is open. After a definable time interval, for instance, after a few milliseconds, the control unit 50 closes the switch that is located between the connecting contacts 33 and 100, as a result of which the voltage source 110 is applied to the relay coil 21. Subsequently, the mechanical switch 22 of the relay 20 is closed in the generally known manner. Since, at the switching instant, the load current is not flowing through the mechanical switch 22 of the relay 20, but rather through the semiconductor relay 60, the relay 20 can be switched with virtually no load as well as with very little wear and tear. Moreover, bouncing that can be caused by the mechanical switch 22 does not have an effect on the load current. At the same time, closing the mechanical switch 22 markedly reduces the power loss through the semiconductor relay 60.

The semiconductor relay 60 can remain open or can be closed during operation. To start with, the case is assumed in which the semiconductor relay 60 remains open during operation. If the relay 20 is now to be switched off, a corresponding switch-off signal is applied to the control unit 50, for instance, via the connecting contact 32. In response to the switch-off signal, the control unit 50 opens the switch that is located between the connecting contacts 33 and 100, as a result of which the control circuit 90 and consequently the mechanical switch 22 are opened. Since, at the switching instant, the semiconductor relay 60 functions as an active bypass for the mechanical switch 22, the mechanical switch 22 can, once again, be opened with virtually no load and with very little wear and tear. After a certain period of time, for instance, a few milliseconds, via the base terminal 61, the control unit 50 causes the semiconductor relay 60 to go into the blocking state, that is to say, the semiconductor relay 60 is opened.

For the case in which the semiconductor relay 60 is switched off during the operation of the relay 20, in other words, while the load circuit 95 is closed, the control unit 50, in response to a switch-off signal, first ensures that the semiconductor relay 60 is switched on once again, that is to say, that it goes into the conductive state. As soon as the bypass created by means of the semiconductor relay 60 is once again active, the control unit 50 ensures that the switch that is located between the connecting contacts 33 and 100 is opened. Consequently, the mechanical switch 22 is likewise opened. Since the load current is fed for the most part via the semiconductor relay 60 at the switching instant, the mechanical switch 22 can, once again, be switched with virtually no load and with very little wear and tear.

If inductive loads are connected to the relay 20, reverse voltages that are implemented when the relay is switched can be kept away from the semiconductor relay 60 by a protective circuit implemented in the adapter 30.

The relay 30 and the relay socket 40 can also be connected to each other without the interposition of the adapter 30. However, if the situation calls for this, the adapter 35 can be interposed between the relay socket 40 and the relay 30, thus creating a hybrid circuit consisting of the semiconductor relay 60 and the relay 20.

While the invention has been particularly shown and described with reference to preferred embodiments thereof, it will be understood by those skilled in the art that various changes in form and details may be made therein without departing from the spirit and scope of the invention.

What is claimed is:

1. A modular circuit arrangement for switching electrical power, the arrangement comprising:

an electromechanical relay including a control circuit, a relay coil and a mechanical switch accommodated in a relay housing including a connector;

an adapter including a semiconductor relay and a control unit accommodated in an adapter housing and provided with a first connection configured to be connected to the control circuit, a second connection configured to be connected to the mechanical switch, a third connection configured to he connected to a load, and a fourth connection configured to be connected to a relay socket;

the relay socket including first connecting contacts configured to be coupled to the fourth connection, and second connecting contacts configured to be connected to a voltage source, wherein the adapter is mechanically detachable and electrically connectable to the relay socket, wherein the electromechanical relay is mechanically detachable and electrically connectable to the adapter, wherein, in a connected condition of the modular circuit arrangement, the semiconductor relay is connected in parallel to the mechanical switch in the relay housing, and wherein the control unit is configured to actuate the electromechanical relay and the semiconductor relay at different times.

2. The modular circuit arrangement recited in claim 1, wherein the adapter includes signal input terminals configured to receive control signals for the control unit, and the first and second connection is configured to connect the electromechanical relay to the semiconductor relay and the control unit, the mechanical switch of the electromechanical relay being, in a connected state, connected in parallel to the semiconductor relay.

3. The modular circuit arrangement recited in claim 2, wherein the third connection is configured to connect a load to the electromechanical relay.

4. The modular circuit arrangement recited in claim l, wherein the adapter includes a voltage source configured to be connected to the relay by the control unit.

5. The modular circuit arrangement recited in claim 1, wherein the second connecting contacts of the relay socket are configured to connect to a voltage source so as to provide electrical connection of the relay socket, the adapter and the electromechanical relay in a connected state such that the voltage source is connectable to the electromechanical relay by the control unit.

6. The modular circuit arrangement recited in claim l, wherein the control unit is configured to switch on the semiconductor relay at a first time and activate the electromechanical relay at a second time in response to a first control signal, the second time being later than the first time.

7. The modular circuit arrangement recited in claim 6, wherein the control unit is configured to deactivate the electromechanical relay and switch off the semiconductor relay at a later time in response to second control signal.

8. The modular circuit arrangement recited in claim 6, wherein the semiconductor relay is configured to be switched off at a third time, and wherein the control unit is configured, in response to a second control signal, to switch on the semiconductor relay again, then deactivate the electromechanical relay after a pre-specified period of time, and switch off the semiconductor relay again at a fourth time, later than the third.

9. An adapter for use with a modular circuit arrangement, the adapter comprising:

a housing;

a semiconductor relay;

a control unit;

a first connection for detachably connecting the control unit to a control circuit of an electromechanical relay that is part of the modular circuit arrangement;

a second connection for detachably connecting the semiconductor relay to a mechanical switch of the electromechanical relay;

a third connection for detachable connection to a load; and a fourth connection for detachable connection to a relay socket that is part of the modular circuit arrangement, wherein the housing accommodates the semiconductor relay and control unit.

10. The adapter recited in claim 9, wherein the control unit includes signal input terminals for receiving control signals.

11. The adapter recited in claim 9, wherein the first connection is connected to the fourth connection via the control unit.

12. The adapter recited in claim 9, wherein the second connection includes a first switch terminal connected to a first semiconductor terminal of the third connection, and a second switch terminal connected to a second semiconductor terminal of the third connection.

* * * * *